United States Patent
Hirose

(10) Patent No.: US 8,759,439 B2
(45) Date of Patent: Jun. 24, 2014

(54) TIRE TREAD RUBBER COMPOSITION

(75) Inventor: Yoshio Hirose, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 13/698,648

(22) PCT Filed: May 25, 2011

(86) PCT No.: PCT/JP2011/061946
§ 371 (c)(1),
(2), (4) Date: Nov. 17, 2012

(87) PCT Pub. No.: WO2011/148965
PCT Pub. Date: Dec. 1, 2011

(65) Prior Publication Data
US 2013/0059965 A1   Mar. 7, 2013

(30) Foreign Application Priority Data

May 26, 2010 (JP) ................... 2010-120006

(51) Int. Cl.
*C08L 9/06* (2006.01)
*C08L 7/00* (2006.01)
*C08K 3/36* (2006.01)
*C08K 5/01* (2006.01)
*B60C 1/00* (2006.01)

(52) U.S. Cl.
CPC .............. *B60C 1/0016* (2013.04); *C08L 9/06* (2013.01); *C08L 7/00* (2013.01); *C08K 3/36* (2013.01); *C08K 5/01* (2013.01); *C08L 2205/02* (2013.01); *C08L 2205/03* (2013.01); *Y10S 152/905* (2013.01)
USPC .......................................... 524/526; 152/905

(58) Field of Classification Search
CPC .............. C08K 3/36; C08K 5/01; C08L 9/06; C08L 7/00; C08L 2205/02; C08L 2205/03; B60C 1/0016
USPC .......................................... 524/526; 152/905
See application file for complete search history.

(56) References Cited

U.S. PATENT DOCUMENTS

| | | | |
|---|---|---|---|
| 6,077,899 A | 6/2000 | Yatsuyanagi et al. | |
| 7,096,903 B2 * | 8/2006 | Weydert et al. | 152/209.1 |
| 2003/0114577 A1 * | 6/2003 | Yatsuyanagi et al. | 524/495 |
| 2007/0167557 A1 | 7/2007 | Dumke et al. | |

FOREIGN PATENT DOCUMENTS

| | | |
|---|---|---|
| DE | 696 34 617 T2 | 3/2006 |
| DE | 10 2007 031 986 A1 | 1/2009 |
| DE | 10 2009 044 393 A1 | 5/2011 |
| EP | 1 808 456 B1 | 7/2007 |
| JP | 08127672 A * | 5/1996 |
| JP | 9-67469 A | 3/1997 |
| JP | 10-87887 A | 4/1998 |
| JP | 2002-97309 A | 4/2002 |
| JP | 2002097309 A * | 4/2002 |
| JP | 2005-171034 A | 6/2005 |
| JP | 2005171034 A * | 6/2005 |
| JP | 2006249188 A * | 9/2006 |
| JP | 2008-143953 A | 6/2008 |
| JP | 2010275386 A * | 12/2010 |

OTHER PUBLICATIONS

JP 08-127672 A (1996), machine translation, JPO Advanced Industrial Property Network (AIPN).*
JP 2002-097309 A (2002), machine translation, JPO Advanced Industrial Property Network (AIPN).*
JP 2005-171034 A (2005), machine translation, JPO Advanced Industrial Property Network (AIPN).*
JP 2006-249188 A (2006), machine translation, JPO Advanced Industrial Property Network (AIPN).*
JP 2010-275386 A (2010), machine translation, JPO Advanced Industrial Property Network (AIPN).*
International Search Report for the Application No. PCT/JP2011/061946 mailed Jun. 21, 2011.
Notification of Reasons for Refusal for the Application No. 2010-120006 from Japan Patent Office dated Jul. 21, 2011.
German Office Action for the Application No. 11 2011 101 778.2 from German Patent Office dated Mar. 5, 2013.

* cited by examiner

*Primary Examiner* — Susannah Chung
*Assistant Examiner* — Josephine Chang
(74) *Attorney, Agent, or Firm* — Cheng Law Group, PLLC

(57) ABSTRACT

A tire tread rubber composition includes: diene rubber containing three kinds of rubber (E-SBR, modified S-SBR, and natural rubber (NR)) in a total amount of 80% by weight or more; and a filler in an amount of 100 to 140 parts by weight based on 100 parts by weight of the diene rubber, the filler containing 70% by weight or more of silica, wherein the diene rubber contains 10 to 25% by weight of the natural rubber, the weight ratio of the three kinds of rubber (E-SBR:modified S-SBR:NR) is 1 to 2:2.5 to 4:1, the styrene content of the E-SBR and the modified S-SBR is 35 to 40% by weight, and the difference between the glass transition temperature of the E-SBR and the glass transition temperature of the modified S-SBR is 10° C. or lower.

9 Claims, 1 Drawing Sheet

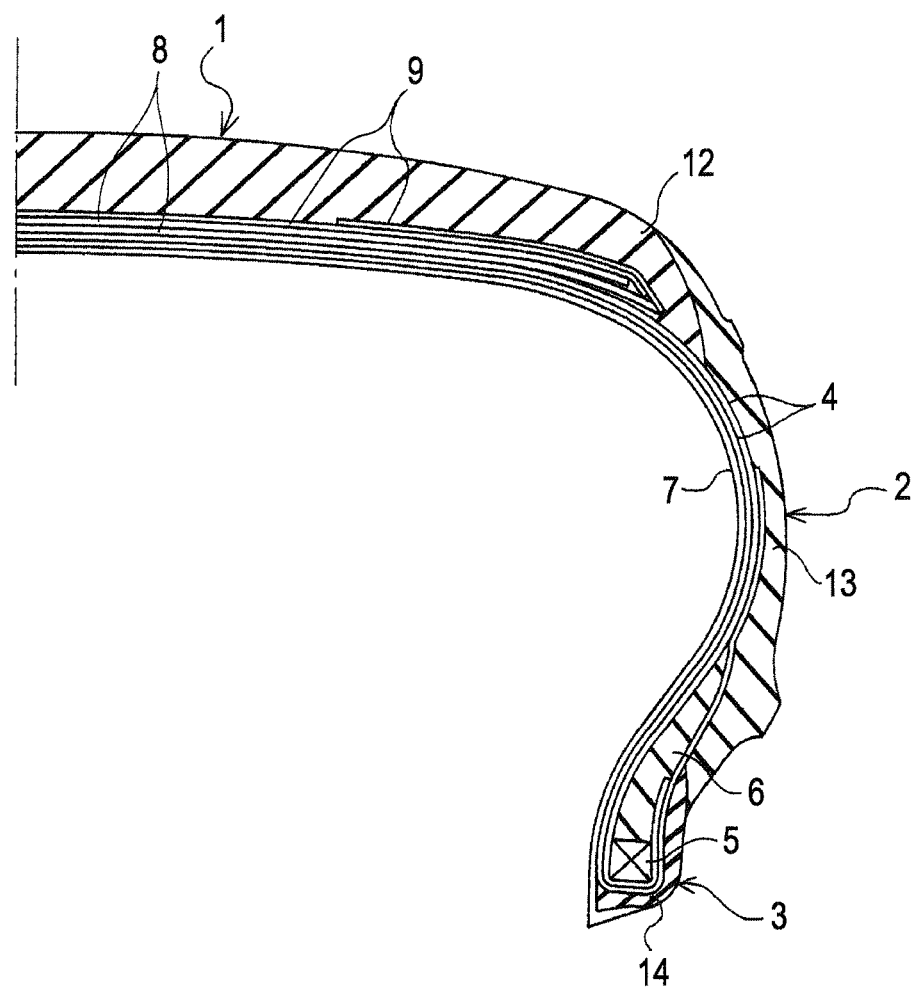

TIRE TREAD RUBBER COMPOSITION

TECHNICAL FIELD

An aspect of the present invention relates to a tire tread rubber composition.

BACKGROUND ART

In general, a pneumatic tire is required to have high fuel efficiency and excellent steering stability on wet road surfaces. Therefore, a large amount of silica is added to a tire tread rubber composition constituting a tread to provide the rubber composition with a decreased rolling resistance and an enhanced wet grip performance. However, the silica-containing rubber composition has a problem of decreased abrasion resistance.

Patent Document 1 proposes a tire rubber composition for improving low rolling resistance and wet grip performance. This rubber composition is prepared by adding silica to a rubber component including natural rubber, solution-polymerized styrene-butadiene rubber, and emulsion-polymerized-styrene butadiene rubber. However, such a rubber composition insufficiently meets the users' demands for three functionalities: low rolling resistance, wet grip performance, and abrasion resistance. Therefore, these three functionalities of the tire rubber composition have been desired to be improved to higher levels, respectively.

PRIOR ART DOCUMENTS

Patent Documents

DISCLOSURE OF THE INVENTION

Solutions to the Problems

A tire tread rubber composition according to an aspect of the present invention includes: diene rubber containing three kinds of rubber, emulsion-polymerized styrene-butadiene rubber (E-SBR), terminal-modified solution-polymerized styrene-butadiene rubber (modified S-SBR), and natural rubber (NR), in a total amount of 80% by weight or more; and a filler in an amount of 100 to 140 parts by weight based on 100 parts by weight of the diene rubber, the filler containing 70% by weight or more of silica, wherein the diene rubber contains 10 to 25% by weight of the natural rubber, the weight ratio of the three kinds of rubber (E-SBR:modified S-SBR:NR) is 1 to 2:2.5 to 4:1, the styrene content in the E-SBR and the modified S-SBR is 35 to 40% by weight, and the E-SBR and the modified S-SBR have their own glass transition temperatures with a difference of 10° C. or lower.

Other objects, features, aspects and advantages the present invention will be apparent from the following detailed description and accompanying drawing.

BRIEF DESCRIPTION OF THE DRAWINGS

FIG. 1 is a partial sectional view of a tire in a meridional direction, illustrating an exemplary pneumatic tire.

DESCRIPTION OF EMBODIMENTS

Hereinafter, embodiments of the present invention will be described in detail.

FIG. 1 is a diagram illustrating an exemplary pneumatic tire according to the present embodiment. The pneumatic tire has a tread 1, a sidewall 2, and a bead 3.

As illustrated in FIG. 1, a bead core 5 is embedded in the bead 3. Two carcass layers 4 are extended between the beads 3 on both sides. The carcass layers 4 are configured such that reinforcing cords extended in the radial direction of the tire are arranged at predetermined intervals in the circumferential direction and embedded in a rubber layer. The both ends of the carcass layers 4 are folded around the bead core 5 from the inside to the outside in the axial direction of the tire to sandwich a bead filler 6. An inner liner layer 7 is arranged inside the carcass layers 4. Two belt layers 8 are arranged on the outer circumference side of the carcass layers 4 in the tread 1. The belt layers 8 are configured such that reinforcing cords extended at a slant in the circumferential direction of the tire are arranged at predetermined intervals in the axial direction of the tire and embedded in the rubber layer. The slant directions against the circumferential direction of the tire in the reinforcing cords of each of the belt layers 8 are opposite to each other. The reinforcing cords of each of the belt layers 8 cross each other. A belt cover layer 9 is arranged on the outer circumference side of the belt layers 8. The tread 1 is formed on the outer circumference side of the belt cover layer 9. The tread 1 has a tread rubber layer 12. The tread rubber layer 12 contains the tire tread rubber composition (the present rubber composition) according to the embodiment. A side rubber layer 13 is arranged outside the carcass layers 4 in each of the sidewalls 2. A rim cushion rubber layer 14 is disposed outside the folded part of the carcass layers 4 in each of the bead 3.

A rubber component of the present rubber composition is diene rubber. The diene rubber preferably contains three kinds of rubber, emulsion-polymerized styrene-butadiene rubber (hereinafter referred to as "E-SBR"), terminal-modified solution-polymerized styrene-butadiene rubber (hereinafter referred to as "modified S-SBR"), and natural rubber (hereinafter referred to as "NR").

The present rubber composition has high abrasion resistance due to the E-SBR added. The E-SBR to be used is not particularly limited as long as it is styrene butadiene rubber produced by emulsion polymerization. The styrene content of the E-SBR is 35 to 40% by weight, and preferably 36 to 39% by weight. The styrene content of the E-SBR set in such a range leads to an increase in rubber strength. Thus, the abrasion resistance of the present rubber composition can be achieved and the wet grip performance can be increased. The glass transition temperature (hereinafter referred to as "Tg") of the E-SBR is preferably −55 to −20° C., and more preferably −50 to −25° C. Use of the E-SBR having such Tg can increase the strength of the present rubber composition. Thus, the abrasion resistance and the wet grip performance of the present rubber composition can be further increased. In the embodiment, the styrene content is determined by infrared spectroscopic analysis (Hampton technique). Tg is the temperature at the midpoint of the glass transition range obtained from the thermogram measurement of the E-SBR by differential scanning calorimetry (DSC). The measurement is performed under the conditions of a temperature-increasing rate of 20° C./min. When the styrene butadiene rubber used is oil extended rubber, Tg is the glass transition temperature of styrene butadiene rubber without an oil extended component (oil).

The modified S-SBR is terminal-modified styrene butadiene rubber produced by solution polymerization so that the rubber has a functional group on one terminal or both terminals of a molecular chain. Examples of the functional group include a hydroxyl group, an alkoxyl group, an epoxy group, a carbonyl group, a carboxyl group, and an amino group. In the present rubber composition, modified S-SBR produced by solution polymerization according to an ordinary method may be used. Alternatively, articles on the market may be used.

Addition of the modified S-SBR can increase the affinity of the present rubber composition to silica and improve the dispersibility of silica. For this reason, in the present rubber composition, the effect of silica is improved and the abrasion resistance is achieved. The styrene content of the modified S-SBR is 35 to 40% by weight, and preferably 36 to 39% by weight. When the styrene content of the modified S-SBR falls within such a range, the rolling resistance can be decreased and the rubber strength can be increased. Thus, the abrasion resistance of the present rubber composition can be increased. Tg of the modified S-SBR is preferably −45 to −15° C., and more preferably −40 to −20° C. Use of the modified S-SBR having such Tg can achieve higher wet grip performance and decrease rolling resistance.

In the present rubber composition, it is preferable that the difference between the Tg of the E-SBR and the Tg of the modified S-SBR be 10° C. or lower. When the difference is 10° C. or lower, the affinity between the E-SBR and the modified S-SBR can be increased. Therefore, the wet grip performance and the abrasion resistance of the present rubber composition can be improved.

The difference between the styrene content of the E-SBR and the styrene content of the modified S-SBR is preferably 4% by weight or less, and more preferably 3% by weight or less. When the difference is 4% by weight or less, the compatibility between the E-SBR and the modified S-SBR can be increased. Thus, the low rolling resistance, the wet grip performance, and the abrasion resistance of the present rubber composition can be improved. Especially, when the difference is less than 4% by weight, the abrasion resistance can be particularly further improved.

The diene rubber in the present rubber composition contains NR. Therefore, the rubber composition can achieve higher wet grip performance while ensuring its abrasion resistance. The amount of the NR is 10 to 25% by weight, and preferably 15 to 22% by weight based on 100% by weight of the diene rubber. When the amount of the NR is less than 10% by weight, the wet grip performance cannot be increased. When the amount of the NR exceeds 25% by weight, the low rolling resistance and the abrasion resistance of the rubber composition deteriorate.

The total amount of three kinds of rubber, the E-SBR, the modified S-SBR, and the NR, is 80% by weight or more, and preferably 90 to 100% by weight based on 100% by weight of the diene rubber. When the total amount of three kinds of rubber is less than 80% by weight, the low rolling resistance, the wet grip performance, and the abrasion resistance of the rubber composition cannot be improved as compared with the conventional level.

The weight ratio of three kinds of rubber (E-SBR:modified S-SBR:NR) is 1 to 2:2.5 to 4:1, and preferably 1.2 to 1.8:2.6 to 3.5:1 when the amount of the NR is 1. When the amount of the E-SBR is less than such a range, the abrasion resistance of the present rubber composition deteriorates. When the amount of the E-SBR exceeds such a range, the wet grip performance of the present rubber composition cannot be increased. When the amount of the modified S-SBR is less than such a range, the wet grip performance of the rubber composition cannot be increased. When the amount of the modified S-SBR exceeds such a range, the abrasion resistance of the present rubber composition deteriorates.

The diene rubber in the present rubber composition may contain only the three rubber components described above. Furthermore, the diene rubber may contain 20% by weight or less, and preferably 10% by weight or less of another diene rubber. Examples of the other diene rubber include isoprene rubber, butadiene rubber, terminal-unmodified S-SBR, butyl rubber, and halogenated butyl rubber. Isoprene rubber, butadiene rubber, or terminal-unmodified S-SBR is preferably used. These kinds of diene rubber may be used alone or a mixture thereof may be used.

The present rubber composition contains a filler containing 70% by weight or more of silica in an amount of 100 to 140 parts by weight, and preferably 110 to 130 parts by weight based on 100 parts by weight of the diene rubber. When the amount of the filler falls within such a range, the low rolling resistance, the wet grip performance, and the abrasion resistance of the present rubber composition can be kept to a high level (balanced at a high level).

The content of silica in 100% by weight of filler is 70% by weight or more, and preferably 85 to 100% by weight. When the content of silica in the filler falls within such a range, the low rolling resistance and the wet grip performance of the rubber composition can be improved. Due to addition of the modified S-SBR as described above, the affinity between silica and diene rubber is increased and the dispersibility of silica is improved. For this reason, the effect of silica is improved and the abrasion resistance is achieved. Examples of silica used in the present rubber composition include any silica ordinarily blended into a tire tread rubber composition, such as wet silica, dry silica, and surface-treated silica.

The present rubber composition may preferably contain a silane coupling agent in addition to silica. Addition of a silane coupling agent can improve the dispersibility of silica. Thus, the reinforcing effect of the diene rubber by silica can be increased. The amount of the added silane coupling agent based on that of silica is preferably 3 to 15% by weight, and more preferably 5 to 10% by weight. When the amount of the silane coupling agent based on that of silica is less than 3% by weight, the dispersibility of silica cannot be sufficiently improved. When it exceeds 15% by weight, the silane coupling agents are polymerized. Therefore, desired effects cannot be achieved.

The silane coupling agent is preferably, but not particularly limited to, a sulfur-containing silane coupling agent. Examples of the sulfur-containing silane coupling agent include bis(3-triethoxysilylpropyl)tetrasulfide, bis(3-triethoxysilylpropyl)disulfide, 3-trimethoxysilylpropyl benzothiazole tetrasulfide, γ-mercaptopropyltriethoxysilane, and 3-octanoylthiopropyltriethoxysilane.

The present rubber composition can contain fillers other than silica. As the fillers other than silica, carbon black, clay, mica, talc, calcium carbonate, aluminum hydroxide, aluminum oxide, or the like can be added. Among them, carbon black is preferably added. Addition of carbon black can increase the strength of rubber, and thus enhance the abrasion resistance of the present rubber composition. The content of carbon black in 100% by weight of filler is preferably 0 to 30% by weight, and more preferably 5 to 20% by weight. When the content of carbon black exceeds 30% by weight, the low rolling resistance deteriorates. Therefore, this is not preferable.

The present rubber composition may preferably contain terpene resin having a softening point equal to or higher than 100° C. This can further increase the wet grip performance of the present rubber composition. The softening point of the terpene resin added is preferably 100° C. or higher, more preferably 100 to 150° C., and further preferably 115 to 135° C. When the softening point of terpene resin is lower than 100° C., the wet grip performance cannot be increased sufficiently. Use of terpene resin having the softening point higher than 150° C. is not preferable since the grip performance during an early phase of traveling may be decreased. The softening point of terpene resin is the temperature measured in accordance with a ring and ball method (JIS K6220-1).

The amount of the terpene resin added is preferably 5 to 25 parts by weight, and more preferably 5 to 20 parts by weight based on 100 parts by weight of the diene rubber. When the amount of the terpene resin added is less than 5 parts by weight, the effect of the terpene resin cannot be obtained sufficiently. When it exceeds 25 parts by weight, the abrasion resistance of the present rubber composition deteriorates.

Examples of the terpene resin include a-pinene resin, P-pinene resin, limonene resin, hydrogenated limonene resin, dipentene resin, terpene phenolic resin, terpene styrene resin, aromatic modified terpene resin, and hydrogenated terpene resin. Among them, resin having the softening point equal to or higher than 100° C. needs to be appropriately selected. It is preferable that aromatic modified terpene resin be used.

The tire tread rubber composition may contain various additives usually used in rubber compositions for a tire tread, such as a vulcanizing agent or a cross-linking agent, a vulcanization accelerator, an age resister, a plasticizer, and a process aid. The additives are mixed in the present rubber composition and kneaded by an ordinary method to vulcanize or cross-link a rubber component of the present rubber composition. The amount of the additives added can be conventional general amount without inhibiting the functions of the present rubber composition. The additives can be mixed in the present rubber composition with a known kneading machine for rubber (e.g., a banbury mixer, a kneader, and a roller).

The present rubber composition can be used suitably for a pneumatic tire illustrated in FIG. 1. Use of the present rubber composition can improve the low rolling resistance, the wet grip performance, and the abrasion resistance of the pneumatic tire.

Hereinafter the present rubber composition will be described in detail with reference to Examples. However, the technical scope of the present rubber composition is not limited to these Examples.

EXAMPLES

Examples 1 to 3 and Comparative Examples 1 to 12 represent 15 different samples of the tire tread rubber composition, respectively. Tables 1 to 3 show mixed components in Examples and Comparative Examples and the amount thereof (ratio by weight). The samples of Examples and Comparative Examples were produced as follows. Components other than sulfur and a vulcanization accelerator were mixed and kneaded with a 1.8-L hermetic mixer for 5 minutes. Sulfur and the vulcanization accelerator were added to the released master batch, and the mixture was then kneaded with an open roller to prepare an unvulcanized tire tread rubber composition. Tables 1 to 3 show the weight ratio of three kinds of rubber (E-SBR:modified S-SBR:NR) as the weight ratio of rubber excluding extended oil, and the difference between the glass transition temperature (Tg) of E-SBR and the glass transition temperature (Tg) of the modified S-SBR. In Comparative Examples 1 and 2, unmodified S-SBR was used instead of the modified S-SBR. For this reason, the weight ratio with respect to the unmodified S-SBR was calculated and shown in Comparative Examples.

Fifteen (15) different tire tread rubber compositions thus obtained were each press-vulcanized in a die with a predetermined shape at 160° C. for 20 minutes to prepare each rubber composition (vulcanized rubber sample) being Examples and Comparative Examples. The abrasion resistance, the wet grip performance, and the low rolling resistance of each rubber composition were measured by methods described below.

Abrasion Resistance

The Lambourn abrasion of each rubber composition was measured by a Lambourn abrasion tester manufactured by Iwamoto Seisakusho in accordance with JIS K6264-2 under conditions of a load of 15 N and a slip ratio of 50%.

The obtained results were converted into relative values (indices) based on the value in Comparative Example 1 defined as 100, and the indices are shown in Tables 1 to 3. A larger index shows that the rubber composition has excellent abrasion resistance.

Wet Grip Performance

The wet grip performance of each rubber composition was evaluated from loss tangent at 0° C. (tan δ (0° C.)). The tan δ (0° C.) is known as an indicator of the wet grip performance. The tan δ (0° C.) of each rubber composition was measured as follows. The loss tangent at 0° C. (tan δ (0° C.)) was measured with a viscoelastic spectrometer manufactured by Toyo Seiki Seisaku-sho, Ltd., under conditions of initial distortion of 10%, amplitude of ±2%, and frequency of 20 Hz.

The obtained results were converted into relative values (indices) based on the value in Comparative Example 1 defined as 100, and the indices are shown in Tables 1 to 3. When the index is large, tan δ (0° C.) is large. This means that the wet grip performance is excellent.

Low Rolling Resistance

The rolling resistance of the obtained vulcanized rubber sample was evaluated from loss tangent at 60° C. (tan δ (60° C.)). The tan δ (60° C.) is known as an indicator of rolling resistance. The tan δ(60° C.) of each rubber composition was measured as follows. The loss tangent at 60° C. (tan δ (60° C.)) was measured with a viscoelastic spectrometer manufactured by Toyo Seiki Seisaku-sho, Ltd., under conditions of initial distortion of 10%, amplitude of ±2%, and frequency of 20 Hz.

A reciprocal of tan δ (60° C.) of each rubber composition, which is a measurement result, was calculated. The reciprocals were converted into relative values (indices) based on the value in Comparative Example 1 defined as 100, and the indices are shown in Tables 1 to 3. When the index is large, tan δ (60° C.) is small, and the rubber composition has low exothermic property. This means that the low rolling resistance is excellent.

TABLE 1

|  | Comparative Example 1 | Comparative Example 2 | Example 1 | Example 2 | Example 3 |
|---|---|---|---|---|---|
| E-SBR1 (part by weight) | 41.25 | 6.88 | 41.25 | 38.50 | 41.25 |
| Modified S-SBR (part by weight) |  |  | 68.75 | 75.63 | 68.75 |
| S-SBR (part by weight) | 68.75 | 103.13 |  |  |  |

TABLE 1-continued

|  | Comparative Example 1 | Comparative Example 2 | Example 1 | Example 2 | Example 3 |
|---|---|---|---|---|---|
| NR (part by weight) | 20 | 20 | 20 | 17 | 20 |
| Silica (part by weight) | 105 | 105 | 105 | 105 | 105 |
| Carbon black (part by weight) | 5 | 5 | 5 | 5 | 5 |
| Terpene resin (part by weight) |  |  |  |  | 10 |
| Zinc oxide (part by weight) | 2 | 2 | 2 | 2 | 2 |
| Stearic acid (part by weight) | 2 | 2 | 2 | 2 | 2 |
| Age resistor (part by weight) | 2 | 2 | 2 | 2 | 2 |
| Wax (part by weight) | 2 | 2 | 2 | 2 | 2 |
| Process aid (part by weight) | 3 | 3 | 3 | 3 | 3 |
| Silane coupling agent (part by weight) | 10.5 | 10.5 | 10.5 | 10.5 | 10.5 |
| Sulfur (part by weight) | 2 | 2 | 2 | 2 | 2 |
| Vulcanization accelerator (part by weight) | 3 | 3 | 3 | 3 | 3 |
| Weight ratio of rubber components (E-SBR:S-SBR:NR) | 1.5:2.5:1 | 0.3:3.75:1 | 1.5:2.5:1 | 1.6:3.2:1 | 1.5:2.5:1 |
| Difference in Tg (° C.) | 14 | 14 | 10 | 10 | 10 |
| Abrasion resistance (index) | 100 | 98 | 104 | 103 | 104 |
| Wet grip (index) | 100 | 99 | 107 | 108 | 109 |
| Rolling resistance (index) | 100 | 103 | 108 | 110 | 109 |

TABLE 2

|  | Comparative Example 3 | Comparative Example 4 | Comparative Example 5 | Comparative Example 6 | Comparative Example 7 | Comparative Example 8 |
|---|---|---|---|---|---|---|
| E-SBR1 (part by weight) | 6.88 | 55 | 55 | 20.63 | 41.25 | 41.25 |
| Modified S-SBR (part by weight) | 103.13 | 61.88 | 55 | 96.25 | 55 | 89.38 |
| NR (part by weight) | 20 | 15 | 20 | 15 | 30 | 5 |
| Silica (part by weight) | 105 | 105 | 105 | 105 | 105 | 105 |
| Carbon black (part by weight) | 5 | 5 | 5 | 5 | 5 | 5 |
| Zinc oxide (part by weight) | 2 | 2 | 2 | 2 | 2 | 2 |
| Stearic acid (part by weight) | 2 | 2 | 2 | 2 | 2 | 2 |

TABLE 2-continued

|  | Comparative Example 3 | Comparative Example 4 | Comparative Example 5 | Comparative Example 6 | Comparative Example 7 | Comparative Example 8 |
|---|---|---|---|---|---|---|
| Age resistor (part by weight) | 2 | 2 | 2 | 2 | 2 | 2 |
| Wax (part by weight) | 2 | 2 | 2 | 2 | 2 | 2 |
| Process aid (part by weight) | 3 | 3 | 3 | 3 | 3 | 3 |
| Silane coupling agent (part by weight) | 10.5 | 10.5 | 10.5 | 10.5 | 10.5 | 10.5 |
| Sulfur (part by weight) | 2 | 2 | 2 | 2 | 2 | 2 |
| Vulcanization accelerator (part by weight) | 3 | 3 | 3 | 3 | 3 | 3 |
| Weight ratio of rubber components (E-SBR:S-SBR:NR) | 0.3:3.8:1 | 2.7:3:1 | 2:2:1 | 1:4.7:1 | 1:1.3:1 | 6:13:1 |
| Difference in Tg (° C.) | 10 | 10 | 10 | 10 | 10 | 10 |
| Abrasion resistance (index) | 98 | 101 | 103 | 97 | 97 | 103 |
| Wet grip (index) | 107 | 99 | 98 | 104 | 100 | 99 |
| Rolling resistance (index) | 108 | 103 | 103 | 105 | 98 | 107 |

TABLE 3

|  | Comparative Example 9 | Comparative Example 10 | Comparative Example 11 | Comparative Example 12 |
|---|---|---|---|---|
| E-SBR1 (part by weight) |  |  | 41.25 | 41.25 |
| E-SBR2 (part by weight) | 45 |  |  |  |
| E-SBR3 (part by weight) |  | 41.25 |  |  |
| Modified S-SBR (part by weight) | 68.75 | 68.75 | 68.75 | 68.75 |
| NR (part by weight) | 20 | 20 | 20 | 20 |
| Silica (part by weight) | 105 | 105 | 90 | 60 |
| Carbon black (part by weight) | 5 | 5 | 5 | 50 |
| Zinc oxide (part by weight) | 2 | 2 | 2 | 2 |
| Stearic acid (part by weight) | 2 | 2 | 2 | 2 |
| Age resistor (part by weight) | 2 | 2 | 2 | 2 |
| Wax (part by weight) | 2 | 2 | 2 | 2 |
| Process aid (part by weight) | 3 | 3 | 3 | 3 |
| Silane coupling agent (part by weight) | 10.5 | 10.5 | 9 | 8.5 |
| Sulfur (part by weight) | 2 | 2 | 2 | 2 |
| Vulcanization accelerator (part by weight) | 3 | 3 | 3 | 3 |
| Weight ratio of rubber components (E-SBR:S-SBR:NR) | 1.5:2.5:1 | 1.5:2.5:1 | 1.5:2.5:1 | 1.5:2.5:1 |
| Difference in Tg (° C.) | 3 | 14 | 10 | 10 |
| Abrasion resistance (index) | 99 | 99 | 96 | 101 |
| Wet grip (index) | 102 | 98 | 98 | 99 |
| Rolling resistance (index) | 103 | 108 | 112 | 95 |

Characteristics of raw materials used in Examples 1 to 3 and Comparative Examples 1 to 12 will be described below.

E-SBR1: emulsion-polymerized styrene-butadiene rubber, styrene content: 37% by weight, Tg: −37° C., Nipol 9548 available from ZEON CORPORATION, extended oil containing 37.5 parts by weight of oil component based on 100 parts by weight of rubber component E-SBR2: emulsion-polymerized styrene-butadiene rubber, styrene content: 48% by weight, Tg: −24° C., Nipol 1749 available from ZEON CORPORATION, extended oil containing 50 parts by weight of oil component based on 100 parts by weight of rubber component E-SBR3: emulsion-polymerized styrene-butadiene rubber, styrene content: 35% by weight, Tg: −41° C., ESBR 1732 available from Dow Chemical Company, extended oil containing 37.5 parts by weight of oil component based on 100 parts by weight of rubber component Modified S-SBR: solution-polymerized styrene-butadiene rubber with hydroxyl group, styrene content: 37% by weight, Tg: −27° C., Tufdene E581 available from Asahi Kasei Chemicals Corp., extended oil containing 37.5 parts by weight of oil component based on 100 parts by weight of rubber component S-SBR: solution-polymerized unmodified styrene-butadiene rubber, styrene content: 39% by weight, Tg: −23° C., Nipol NS522 available from ZEON CORPORATION, extended oil containing 37.5 parts by weight of oil component based on 100 parts by weight of rubber component NR: natural rubber, RSS#3

Silica: Zeosil 1165MP available from Rhodia

Carbon black: SHOBLACK N339 available from Cabot Japan Corporation

Terpene resin: aromatic modified terpene resin, YS resin TO125 available from YASUHARA CHEMICAL Co., Ltd., softening point: 125° C.

Zinc oxide: Zinc Oxide #3 available from Seido Chemical Industry Co., Ltd.

Stearic acid: Beads stearic acid YR available from NOF CORPORATION

Age resistor: Santoflex 6PPD available from Flexsys

Wax: SUNNOC available from Ouchi Shinko Chemical Industrial Co., Ltd.

Process Aid: STRUKTOL A50P available from SCHILL & SEILACHER Gmbh. & CO.

Silane coupling agent: Sulfur-containing silane coupling agent, Si75 available from Evonik Degussa Sulfur: "Golden Flower" Oil Treated Sulfur Powder available from Tsurumi Chemical Industry Co., Ltd.

Vulcanization accelerator: vulcanization accelerator CBS, NOCCELER CZ-G available from Ouchi Shinko Chemical Industrial Co., Ltd.

As is evident from Table 1, the measurements performed on the tire tread rubber compositions of Examples 1 of 3 confirmed that all the abrasion resistance, the wet grip performance, and the low rolling resistance had been all improved. In the rubber composition of Comparative Example 2, the S-SBR is increased. Thus, the low rolling resistance is improved as compared with that of Comparative Example 1, but the abrasion resistance is insufficient.

As is evident from Table 2, the weight ratio of the E-SBR in the rubber composition of Comparative Example 3 is small, and therefore the abrasion resistance is insufficient as compared with that of Comparative Example 1. The weight ratio of the E-SBR in the rubber composition of Comparative Example 4 is large, and therefore the wet grip performance is insufficient. The weight ratio of the modified S-SBR in the rubber composition of Comparative Example 5 is small, and therefore the wet grip performance is insufficient. The weight ratio of the modified S-SBR in the rubber composition of Comparative Example 6 is large, and therefore the abrasion resistance is insufficient. The weight ratio of the NR in the rubber composition of Comparative Example 7 is large, and therefore the abrasion resistance is insufficient and the low rolling resistance deteriorates. The weight ratio of the NR in the rubber composition of Comparative Example 8 is small, and therefore the wet grip performance is insufficient.

As shown in Table 3, the styrene content of the E-SBR2 in the rubber composition of Comparative Example 9 exceeds 40% by weight. Thus, the abrasion resistance is lower than that of Comparative Example 1. The difference between Tg of the E-SBR3 and Tg of the modified S-SBR in the rubber composition of Comparative Example 10 is larger than 10° C., and therefore the abrasion resistance is low. Thus, the wet grip performance is insufficient. In the rubber composition of Comparative Example 11, the total content of a filler containing silica and carbon black is less than 100 parts by weight. Thus, the abrasion resistance and the wet grip performance are insufficient. In the rubber composition of Comparative Example 12, the content of silica in the filler is less than 70% by weight. Thus, the wet grip performance is low, and the low rolling resistance is insufficient.

As described above, the present rubber composition is a tire tread rubber composition having low rolling resistance, wet grip performance, and abrasion resistance, which are higher than the conventional levels.

The present rubber composition contains diene rubber containing three kinds of rubber, emulsion-polymerized styrene-butadiene rubber (E-SBR), terminal-modified solution-polymerized styrene-butadiene rubber (modified S-SBR), and natural rubber (NR), in a total amount of 80% by weight or more. The present rubber composition contains a filler in an amount of 100 to 140 parts by weight based on 100 parts by weight of the diene rubber. The filler contains 70% by weight or more of silica. The amount of the NR in the diene rubber is 10 to 25% by weight. The weight ratio of the three kinds of rubber (E-SBR:modified S-SBR:NR) is 1 to 2:2.5 to 4:1. As a result, the affinity between diene rubber and silica can be increased. Thus, the dispersibility of silica can be improved and the abrasion resistance can be increased.

In the present rubber composition, the styrene content of the E-SBR and the modified S-SBR is 35 to 40% by weight. The difference between the glass transition temperature of the E-SBR and the glass transition temperature of the modified S-SBR is 10° C. or lower. As a result, the compatibility between the E-SBR and the modified S-SBR can be increased. Furthermore, when the weight ratio of three kinds of rubber falls within such a range, the low exothermic property and the rubber strength can be kept to a high level. Thus, the low rolling resistance, the wet grip performance, and the abrasion resistance of the present rubber composition are further improved as compared with the conventional levels.

As described above, the terminal-modified solution-polymerized styrene-butadiene rubber preferably has at least one functional group selected from a group consisting of a hydroxyl group, an alkoxyl group, an epoxy group, a carbonyl group, a carboxyl group, and an amino group.

Preferably, the terpene resin having the softening point of 100° C. or higher may be added in an amount of 5 to 25 parts by weight based on 100 parts by weight of the diene rubber. This can further increase the wet grip performance.

The low rolling resistance, the wet grip performance, and the abrasion resistance of a pneumatic tire using the present rubber composition are improved as compared with the conventional levels.

This application is based on Japanese Patent Application No. 2010-120006 filed on May 26, 2010 by the applicant, the entire content of which is incorporated herein by reference. Furthermore, the entire content of JP-A 2002-97309 cited in the background of the invention is incorporated herein by reference.

The description of the particular embodiment of the present invention has been presented for the purpose of illustration. The description is not intended to be exhaustive and limit the present invention to the described embodiment. It is apparent to those skilled in the art from the above description that various modifications and changes can be made.

The invention claimed is:

1. A tire tread rubber composition comprising:
a filler in an amount of 100 to 140 parts by weight based on 100 parts by weight of diene rubber, wherein the filler contains 70% by weight or more of silica, and the diene rubber contains 80% or more of (1) emulsion-polymerized styrene butadiene rubber (E-SBR), (2) terminal-modified solution-polymerized styrene butadiene rubber (modified S-SBR), and (3) natural rubber (NR),
the diene rubber contains 10 to 25% by weight of the natural rubber,
a weight ratio of E-SBR:modified S-SBR:NR is 1 to 2:2.5 to 4:1,
the styrene content of each of the E-SBR and the modified S-SBR is 35 to 40% by weight, and
a difference between the glass transition temperature of the E-SBR and that of the modified S-SBR is less than 10° C.

2. The tire tread rubber composition according to claim 1, wherein a functional group of the terminal-modified solution-polymerized styrene-butadiene rubber is at least one kind selected from a hydroxyl group, an alkoxyl group, an epoxy group, a carbonyl group, a carboxyl group, and an amino group.

3. The tire tread rubber composition according to claim 2, comprising a terpene resin having a softening point of 100° C. or higher in an amount of 5 to 25 parts by weight based on 100 parts by weight of the diene rubber.

4. The tire tread rubber composition according to claim 1, comprising a terpene resin having a softening point of 100° C. or higher in an amount of 5 to 25 parts by weight based on 100 parts by weight of the diene rubber.

5. The tire tread rubber composition according to claim 1, wherein the filler contains 85% by weight or more of silica.

6. A pneumatic tire made of the tire tread rubber composition according to claim 1.

7. A pneumatic tire made of the tire tread rubber composition according to claim 2.

8. A pneumatic tire made of the tire tread rubber composition according to claim 4.

9. A pneumatic tire made of the tire tread rubber composition according to claim 3.

* * * * *